United States Patent
Marr et al.

(10) Patent No.: US 10,374,675 B1
(45) Date of Patent: Aug. 6, 2019

(54) DIRECT DIGITAL SYNTHESIS BASED PHASE SHIFT DIGITAL BEAM FORMING

(71) Applicant: RAYTHEON COMPANY, Waltham, MA (US)

(72) Inventors: Harry B. Marr, Manhattan Beach, CA (US); Daniel Thompson, Hermosa Beach, CA (US); Ralston S. Robertson, Northridge, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/913,835

(22) Filed: Mar. 6, 2018

(51) Int. Cl.
*H04L 27/00* (2006.01)
*H04B 7/06* (2006.01)

(52) U.S. Cl.
CPC .................. *H04B 7/0617* (2013.01)

(58) Field of Classification Search
CPC ..... H04L 1/0003; H04L 1/0071; G01S 17/10; G01S 17/36; G01S 7/4811; G06F 3/045; G06F 1/021; G06F 1/022; G06F 1/0342
USPC ........ 375/295, 257, 303, 340; 455/255, 260; 340/76
See application file for complete search history.

(56) References Cited

U.S. PATENT DOCUMENTS 5,764,187 A 6/1998 Rudish et al.
9,182,479 B2 * 11/2015 Chen ....................... G01S 7/282
9,520,886 B2 * 12/2016 Dionne ..................... H03L 1/00
2006/0125687 A1 1/2006 Greeley
2009/0033375 A1 * 2/2009 Max ..................... G01R 31/2841
327/106
2017/0010723 A1 * 1/2017 Smith ..................... G06F 3/045

OTHER PUBLICATIONS

Avitabile, G. et al., "Phase shifter based on DDS-driven offset-PPL", Electronics Letters, Dec. 7, 2006, 2 pages, vol. 42, No. 25.
Jiaguo, Lu et al., "Active Phased Array Antenna Based on DDS", IEEE, 2003, pp. 511-516.
Buttler, Jesse L., "Digital, Matrix, and Intermediate-Frequency Scanning", In; Microwave Scanning Antennas, vol. III: Array Systems, Jan. 1, 1966, Academic Press (40 pgs.).
International Search Report for corresponding International Application No. PCT/US2019/019838, filed Feb. 27, 2019, International Search Report dated May 7, 2019 and dated May 17, 2019 (4 pgs.).
Written Opinion of the International Searching Authority for corresponding International Application No. PCT/US2019/019838, filed Feb. 27, 2019, Written Opinion of the International Searching Authority dated May 17, 2019 (8 pgs.).

* cited by examiner

*Primary Examiner* — Khai Tran
(74) *Attorney, Agent, or Firm* — Lewis Roca Rothgerber Christie LLP

(57) ABSTRACT

A system for beamforming, in a phased array antenna. Subtraction of a sinusoidal signal from a received signal, or from a signal to be transmitted, is used to shift the phase of the received signal, or from a signal to be transmitted. A separate sinusoidal signal may be generated for each antenna array element, making it possible to shift the phase on a per-element basis, to perform beamforming.

15 Claims, 5 Drawing Sheets

$$e^{jx} = \cos(x) + j\sin(x)$$
$$A\sin(a \pm b) = \sin(a)\cos(b) \pm \cos(a)\sin(b)$$
$$\sin(wt + \pi/2) = \cos(wt)$$

*FIG. 2A*

$$Ae^{j(wt+\emptyset)} = A\{\cos(wt + \emptyset) + j\sin(wt + \emptyset)\}$$
$$= A\{\cos(wt)\cos(\emptyset) - \sin(wt)\sin(\emptyset) + j\sin(wt)\cos(\emptyset) + j\cos(wt)\sin(\emptyset)\}$$
$$\text{set } a = \cos(\emptyset) \text{ and } b = \sin(\emptyset)$$
$$= A\{a[\cos(wt) + j\sin(wt)] - b[\cos(wt + \pi/2) - j\sin(wt + \pi/2)]\}$$
$$= A\{ae^{jwt} - be^{-j(wt+\pi/2)}\}$$

*FIG. 2B*

$$Ae^{j(wt+\emptyset)} = A\{ae^{jwt} - be^{-j(wt+\pi/2)}\}$$

$$a = cos(\emptyset) \text{ and } b = sin(\emptyset)$$

$$A\{ae^{jwt} - be^{-j(wt+\pi/2)}\} = Aae^{jwt} - Abe^{-j(wt+\pi/2)}$$

$$= Ae^{jwt} - \frac{Ab}{a}e^{-j(wt+\pi/2)}$$

FIG. 2C

DIRECT DIGITAL SYNTHESIS BASED PHASE SHIFT DIGITAL BEAM FORMING

FIELD

One or more aspects of embodiments according to the present invention relate to beamforming for phased array antennas, and more particularly to direct digital synthesis based phase shift digital beam forming.

BACKGROUND

Beamforming circuits for phased array antennas may be used to steer a transmitted or received beam and to control its shape. Such beamforming circuits may include analog phase shifters, or digital phase shifters that use a complex multiplication for each element during each sample interval. Beamforming circuits implemented according to such designs may be costly and may consume significant amounts of power.

Thus, there is a need for an improved system for beam forming.

SUMMARY

Aspects of embodiments of the present disclosure are directed toward a system for beamforming, in a phased array antenna. Subtraction of a sinusoidal signal from a received signal, or from a signal to be transmitted, is used to shift the phase of the received signal, or from a signal to be transmitted. A separate sinusoidal signal may be generated for each antenna array element, making it possible to shift the phase on a per-element basis, to perform beamforming.

According to an embodiment of the present invention there is provided a transmitter, including: a first antenna element; a second antenna element; a first waveform generator; a second waveform generator; a third waveform generator; a first differencing circuit, having: a first input connected to the first waveform generator, a second input connected to the second waveform generator, and an output operatively coupled to the first antenna element, and being configured to generate at the output the difference between a signal at the first input and a signal at the second input; and a second differencing circuit, having: a first input connected to the first waveform generator, a second input connected to the third waveform generator, and an output operatively coupled to the second antenna element, and being configured to generate at the output the difference between a signal at the first input and a signal at the second input.

In one embodiment, the second waveform generator is configured to generate a piecewise sinusoidal signal and the third waveform generator is configured to generate a piecewise sinusoidal signal.

In one embodiment, each of: the first waveform generator; the second waveform generator; the third waveform generator; the first differencing circuit; and the second differencing circuit, is a portion of a digital circuit.

In one embodiment, the transmitter includes: a first digital to analog converter having: an input connected to the output of the first differencing circuit, and an output; a first mixer having an intermediate frequency port, a local oscillator input, and a radio frequency port, the intermediate frequency port being connected to the output of the first digital to analog converter; a first filter having: an input connected to the radio frequency port of the first mixer, and an output; a first amplifier having an input connected to the output of the first filter and an output connected to the first antenna element; a second digital to analog converter having: an input connected to the output of the second differencing circuit, and an output; a second mixer having an intermediate frequency port, a local oscillator input, and a radio frequency port, the intermediate frequency port being connected to the output of the second digital to analog converter; a second filter having: an input connected to the radio frequency port of the second mixer, and an output; and a second amplifier having an input connected to the output of the second filter and an output connected to the second antenna element.

In one embodiment, the digital circuit is a hard-wired digital circuit.

In one embodiment, the digital circuit is a programmable digital circuit.

In one embodiment, the first waveform generator is configured to generate a modulated waveform.

In one embodiment, the first waveform generator includes a direct digital synthesizer.

In one embodiment, each of: the second waveform generator; and the third waveform generator includes a direct digital synthesizer.

According to an embodiment of the present invention there is provided a receiver, including: a first antenna element; a second antenna element; a first waveform generator; a second waveform generator; a first differencing circuit, having: a first input operatively coupled to the first antenna element, a second input connected to the first waveform generator, and an output, and being configured to generate at the output the difference between a signal at the first input and a signal at the second input; a second differencing circuit, having: a first input operatively coupled to the second antenna element, a second input connected to the second waveform generator, and an output, and being configured to generate at the output the difference between a signal at the first input and a signal at the second input; and an adding circuit, having a first input connected to the output of the first differencing circuit and a second input connected to the output of the second differencing circuit.

In one embodiment, the first waveform generator is configured to generate a piecewise sinusoidal signal and the second waveform generator is configured to generate a piecewise sinusoidal signal.

In one embodiment, each of: the first waveform generator; the second waveform generator; the first differencing circuit; the second differencing circuit; and the adding circuit, is a portion of a digital circuit.

In one embodiment, the receiver includes: a first analog to digital converter having: an output connected to the first input of the first differencing circuit, and an input; a first mixer having an intermediate frequency port, a local oscillator input, and a radio frequency port, the intermediate frequency port being connected to the input of the first analog to digital converter; a first filter having: an output connected to the radio frequency port of the first mixer, and an input; a first amplifier having an output connected to the input of the first filter and an input connected to the first antenna element; a second analog to digital converter having: an output connected to the first input of the second differencing circuit, and an input; a second mixer having an intermediate frequency port, a local oscillator input, and a radio frequency port, the intermediate frequency port being connected to the input of the second analog to digital converter; a second filter having: an output connected to the radio frequency port of the second mixer, and an input; and a second amplifier having an output connected to the input of the second filter and an input connected to the second antenna element.

In one embodiment, each of: the first filter, and the second filter is a band-pass filter.

In one embodiment, the digital circuit is a hard-wired digital circuit.

In one embodiment, the digital circuit is a programmable digital circuit.

In one embodiment, each of: the first waveform generator; and the second waveform generator includes a direct digital synthesizer.

BRIEF DESCRIPTION OF THE DRAWINGS

Features, aspects, and embodiments are described in conjunction with the attached drawings, in which:

FIG. 2A is a set of equations, according to an embodiment of the present invention;

FIG. 2B is a set of equations, according to an embodiment of the present invention;

FIG. 2C is a set of equations, according to an embodiment of the present invention;

DETAILED DESCRIPTION

The detailed description set forth below in connection with the appended drawings is intended as a description of exemplary embodiments of a system for direct digital synthesis based phase shift digital beam forming provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Phased array antennas may be employed with suitable control circuits to generate a controllable antenna pattern, or "beam" that may be electronically steered, or the shape (e.g., the width) of which may be adjusted, by adjusting the phase shift of each of the antenna elements of the antenna array. For a transmitting antenna, this may be accomplished by adjusting the respective phases with which a common feed signal is supplied to each of the plurality of antenna elements. For a receiving antenna, beam steering or beam shape control (collectively referred to as "beamforming") may be accomplished by adjusting the respective phase shifts applied to each of the respective received signals received by the plurality of antenna elements. Amplitude control (i.e., attenuation or gain that varies from antenna element to antenna element) may also be used to affect the shape of a transmitted or received beam.

The phase shifts used for such beamforming may be applied, for example, using analog or digital circuits and methods for either transmitting or receiving beam forming. For example, complex multiplications (one per sample per antenna element) may be used to implement a phase shift in a digital circuit. In other circuits, RF phase shifters (which may operate on in-phase and quadrature components of the signal and perform a (signed) amplitude shift on the in-phase and quadrature components, per element) may be employed to perform operations equivalent to complex multiplication. In some circuits true time delay may be implemented with an interpolating finite impulse response (FIR) filter. Such circuits may be complex, resulting in relatively high cost, and potentially high mass and power consumption.

Figure 1:
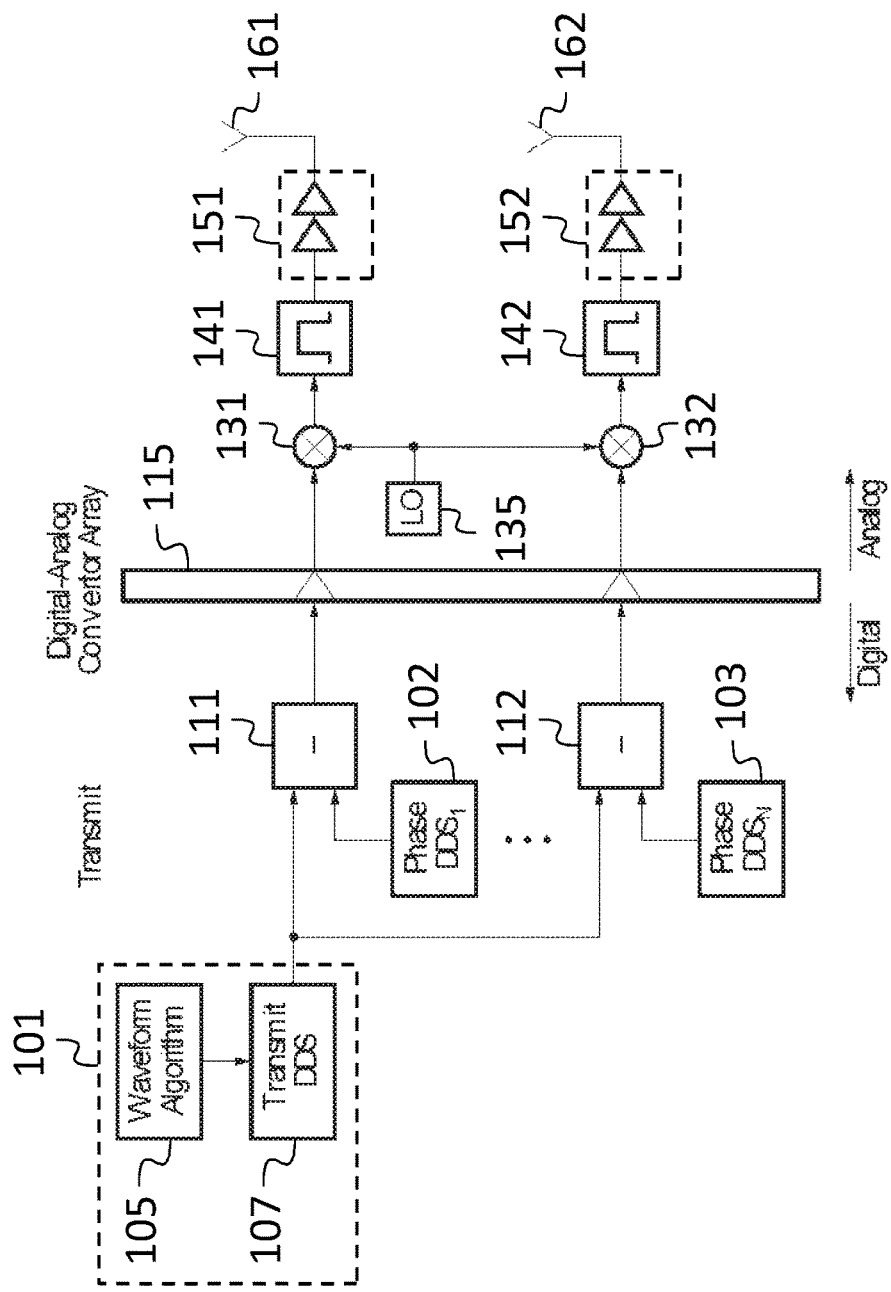
FIG. 1 is a block diagram of a portion of a transmitter, according to an embodiment of the present invention.

Referring to FIG. 1, in some embodiments, a circuit employing complex subtraction may be used to effect phase shifts for a phased array antenna, resulting in a significant reduction in circuit size and complexity. FIG. 1 shows an exemplary implementation for a transmitting phased array antenna; an analogous circuit may be used for a receiving phased array antenna, as discussed in further detail below. Referring to FIG. 1, in some embodiments, a first waveform generator 101 generates a waveform to be transmitted, e.g., a modulated communication waveform such as may be used by a commercial 5G cellular network, or a chirped pulse such as may be used by a (military or commercial) radar system. The waveform generated by the first waveform generator 101 is fed to both a first differencing circuit 111 and a second differencing circuit 112. Each of the first differencing circuit 111 and the second differencing circuit 112 has a first input (connected to the first waveform generator 101), a second input, and an output, and is configured to generate, at its respective output, the difference between a signal at its respective first input and a signal at its respective second input. The second input of each of the first differencing circuit 111 and the second differencing circuit 112 is connected to a respective one of a second waveform generator 102 and a third waveform generator 103. The output of each of the first differencing circuit 111 and the second differencing circuit 112 is connected to a digital to analog converter 115 of an array of digital to analog converters 115. Each of the waveform generators 101, 102, 103 and each of the differencing circuits 111, 112 may be a digital circuit, or several or all of them may be portions of a single digital circuit. Each such digital circuit may be a hard-wired digital circuit (e.g., an application-specific integrated circuit) or it may be a programmable digital circuit such as a field-programmable gate array (FPGA).

The outputs of the two digital to analog converters 115 to which the respective outputs of the first differencing circuit 111 and the second differencing circuit 112 are connected are fed to a respective intermediate frequency (IF) port of a first mixer 131 and a second mixer 132. Each of the first mixer 131 and the second mixer 132 may further have a local oscillator (LO) input and a radio frequency (RF) port. The local oscillator inputs of the first mixer 131 and the second mixer 132 are fed by the output of a local oscillator 135. It will be understood that in the context of a mixer port, "radio frequency" and "(RF)" do not refer to a frequency range but rather to the port at which the mixer is configured to receive or output a frequency that is generally higher than that at the intermediate frequency port; in the embodiment of FIG. 1 (and of FIG. 3, discussed below) the frequency of the signal at the radio frequency port may be any frequency suitable for use with an array antenna and may include, for example, frequencies as low as those in the medium frequency (MF) range, microwave frequencies, and millimeter wave frequencies. Each of the radio frequency ports of these mixers 131, 132 may be connected to an input of a respective filter 141, 142 (e.g., a band-pass filter, as illustrated in FIG. 1, or a high-pass filter) and the outputs of the filters may be connected respectively to first and second amplifiers (e.g., power amplifiers) 151, 152, each of which consist of a cascade of two or more amplifiers as shown, and which may in turn be connected respectively to first and second antenna elements 161, 162.

One or more of the waveform generators 101, 102, 103 may be (or include) a numerically controlled oscillator (NCO), such as an arbitrary waveform generator, or a direct digital synthesizer (DDS). A direct digital synthesizer may have a clock or "sampling clock" input and an output. The signal at the output may be updated once per clock cycle of the sampling clock signal received at a sampling clock input of the direct digital synthesizer. The direct digital synthesizer may include a phase increment register, a phase accumulator, and a look-up table. It may further include a digital to analog converter if its output is an analog signal, or the digital to analog converter may be absent if its output is a digital signal (as in the embodiment of FIG. 1). Once per cycle of the sampling clock signal the phase accumulator may have added to it (with any overflow discarded) the value of the phase increment register, and the value of the phase accumulator (or a portion of it, e.g., the most significant n bits, if the phase accumulator is an m bit wide register (with m greater than n)) may be used as a pointer to an address in the lookup table, which may be pre-programmed with a waveform, e.g., with one cycle of a sine wave.

The value in the lookup table identified (or addressed) by the pointer, may be the value output by the direct digital synthesizer (or the addressed lookup table value may be fed to the digital to analog converter, converted to an analog voltage, and provided at the output of the direct digital synthesizer, in an embodiment with analog output). Thus, by selecting the phase increment, the direct digital synthesizer may be configured to generate an approximately sinusoidal output signal with a frequency that is a fraction of the sampling clock frequency. If, for example, the phase accumulator generates an output that advances, for each cycle of the sampling clock, by $\frac{1}{10}^{th}$ cycle (36 degrees, or $\frac{1}{10}^{th}$ the length of the lookup table if the lookup table is pre-programmed with one cycle of a sine wave), the output frequency is one-tenth of the sampling clock frequency. The output of the direct digital synthesizer may, in such an embodiment, be a step-wise (or "piece-wise constant") approximation to a sine wave at a frequency that is $\frac{1}{10}^{th}$ of the sampling clock frequency.

A phase modulated or frequency modulated waveform, such as a chirp, or (e.g., for some commercial communications applications) a quadrature phase shift keying (QPSK) modulated signal, may be generated by modifying (e.g., overwriting) the phase increment register (to change the frequency of the generated waveform) or the phase accumulator (to change the phase of the generated waveform). As shown in FIG. 1, the first waveform generator 101 may include a waveform algorithm circuit 105 and a direct digital synthesizer 107. The waveform algorithm circuit 105 may generate phase increment values and/or phase accumulator values and write them to the corresponding register or registers of the direct digital synthesizer 107. A chirp with an increasing frequency may be generated, for example, by repeatedly increasing the value of the phase increment register.

In some embodiments, one or more of the waveform generators 101, 102, 103 may, as mentioned above, instead be an arbitrary waveform generator. In an arbitrary waveform generator an address register stores an address in a lookup table (i.e., a pointer), and the pointer is incremented once per clock cycle (with any overflow being discarded if the bit width of the pointer corresponds to the number of values stored in the lookup table, or, for a wider pointer, with the pointer being reset to point to the beginning of the lookup table if after being incremented it points to a position past the end of the lookup table). An arbitrary waveform generator may be configured to generate a chirp by programming the lookup table with a chirped waveform (i.e., multiple cycles of a sinusoidal waveform, with frequency increasing toward the end of the lookup table).

The system of FIG. 1 may be seen to be capable of performing beam steering (and a system with more than two elements may be seen, according to an analogous analysis, to be capable of beam forming) as follows. Referring to FIGS. 2A-2C, it may be shown that $$Ae^{j(\omega t+\phi)} = Ae^{j\omega t} - \frac{Ab}{a}e^{j(\omega t+\pi/2)},$$

i.e., that to shift the phase of a first sinusoidal signal $Ae^{j\omega t}$ by an amount Ø it is sufficient to subtract from it a second sinusoidal signal at the same frequency, the second sinusoidal signal having the form $$\frac{Ab}{a}e^{j(\omega t+\pi/2)},$$

where α=cos Ø and b=sin Ø.

Although the derivation is for the case in which both signals are at the same, single frequency, similar phase shifts may be effected for a first signal that is not strictly sinusoidal but instead has finite bandwidth (e.g., as a result of the signal being modulated with data or chirped). If the fractional bandwidth of the first signal (i.e., the ratio of the bandwidth of the first signal to the center frequency of the first signal) is sufficiently small (e.g., less than 0.20), then the phase shift is performed with little or no degradation to the angle of the eventual beam that is formed. As will be understood by one of skill in the art, as the fractional bandwidth increases, the beam that is formed by the phase shifters will squint off of the intended pointing angle at the edge of the instantaneous bandwidth of the modulated signal. As the beam squints, or moves off of the intended pointing angle as in the case of signals with a very large fractional bandwidth, this results in a lower signal processing gain generated for that beam at the intended target. However, this lower signal processing gain may be acceptable in exchange for the lower computational load and less hardware to perform a phase shift instead of a true time delay; a true time delay computation may be performed on very wide band signals instead of a phase shift to achieve zero beam squint. The second signal may be a piecewise sinusoidal signal, i.e., it may be a single-frequency sinusoid, with occasional changes in the amplitude or phase, or both, when changes in beamforming are made (e.g., when the beam is steered to a different direction, or its shape is changed).

In some embodiments the second and third waveform generators 102, 103 also generate modulated waveforms. For example, each of the second and third waveform generators 102, 103 may be a direct digital synthesizer, and the waveform algorithm circuit 105 (or additional waveform algorithm circuits) may also generate phase increment values and/or phase accumulator values for the second and third waveform generators 102, 103 and write them to the corresponding register or registers of these direct digital synthesizers. The phase increment values and/or phase accumulator values written to the second waveform generator 102 may be calculated so that the phase of the signal produced by the second waveform generator 102 is constant, relative to the phase of the signal produced by the first waveform generator 101, even as the frequency and/or phase of the signal produced by the first waveform generator 101 are modulated. Similarly, the phase increment values and/or phase accumulator values written to the third waveform generator 103 may be calculated so that the phase of the signal produced by the third waveform generator 103 is constant, relative to the phase of the signal produced by the first waveform generator 101. For example, if the first waveform generator 101 generates a quadrature phase shift keying (QPSK) modulated signal, the phase increment values in all three waveform generators 101, 102, 103 may be the same, and constant, and the phase accumulator values written to the second and third waveform generators 102, 103 may differ by constant respective offsets from the phase accumulator values written to the first waveform generator 101.

Figure 3:
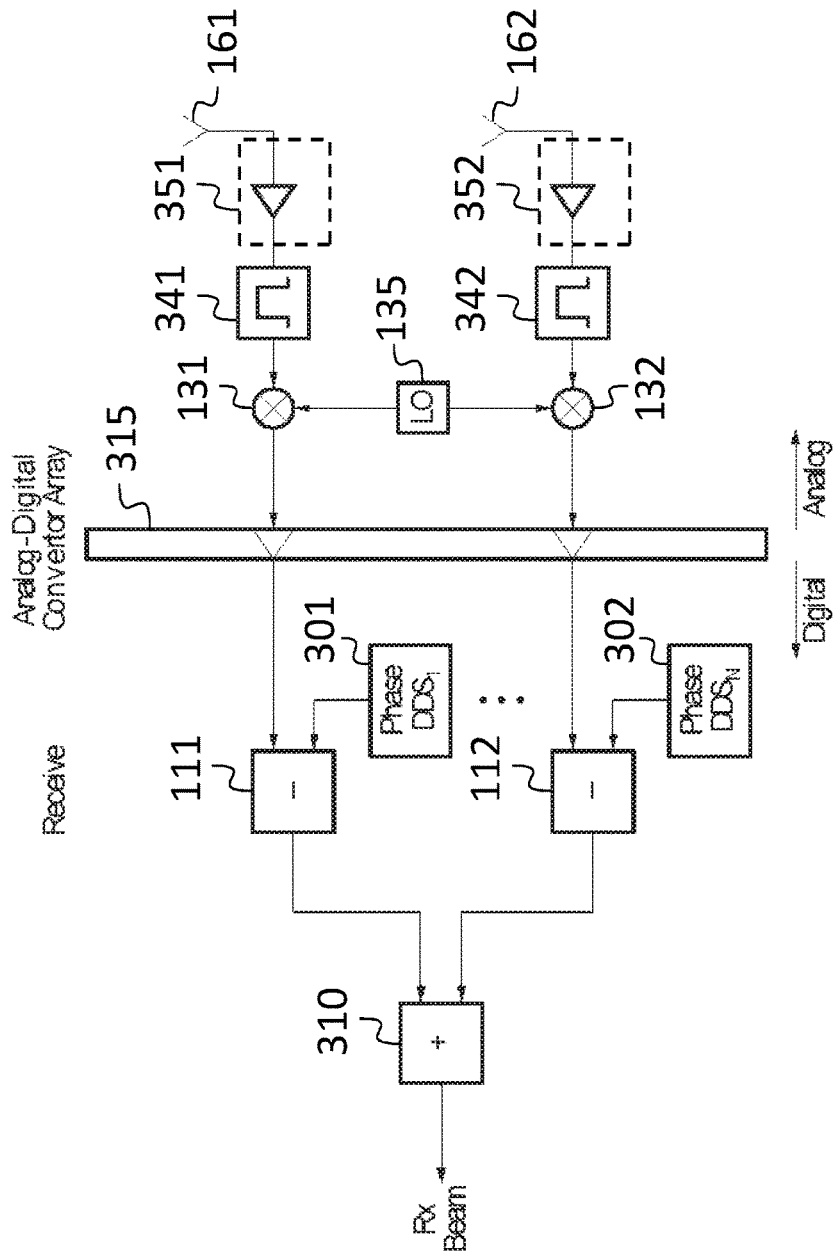
FIG. 3 is a block diagram of a portion of a transmitter, according to an embodiment of the present invention.

FIG. 3 shows an exemplary implementation for a circuit employing complex subtraction to effect phase shifts for a receiving phased array antenna. In some embodiments, a waveform, e.g., a modulated communication waveform such as may be used by a commercial 5G cellular network, or a chirped pulse such as may be used by a (commercial or military) radar system, is received by first and second antenna elements 161, 162. The first and second antenna elements 161, 162 are connected respectively to first and second amplifiers (e.g., low noise amplifiers) 351, 352, the outputs of which are fed, respectively, through first and second filters (e.g., band-pass filters) 341, 342 to respective radio frequency ports of a first mixer 131 and a second mixer 132. The local oscillator inputs of the first mixer 131 and the second mixer 132 are fed by the output of a local oscillator 135. The respective intermediate frequency ports of the first mixer 131 and the second mixer 132 are connected to two respective analog to digital converters of an array of analog to digital converters 315. The outputs of the two analog to digital converters are connected, respectively, to respective first inputs of a first differencing circuit 111 and a second differencing circuit 112, each having an output, the two outputs being connected to an adding circuit 310. Each of the first differencing circuit 111 and the second differencing circuit 112 further has a respective second input, connected to a respective one of a first waveform generator 301 and a second waveform generator 302. Each of the first differencing circuit 111 and the second differencing circuit 112 is configured to generate, at its respective output, the difference between a signal at its respective first input and a signal at its respective second input.

Each of FIGS. 1 and 3 shows a phased array antenna with two elements, but the invention is not limited to these configurations, and in general the phased array antenna used in a transmitter or in a receiver may have more than two (e.g., more than 10, more than 100 or more than 1,000) elements. In some embodiments an array of antenna elements is shared by a transmitter and a receiver. In FIGS. 1 and 3 the output of each of the waveform generators 101, 102, 103, 301, 302, the differencing circuits 111, 112, and the adding circuit 310, is a digital signal, and each of the waveform generators 101, 102, 103, 301, 302, the differencing circuits 111, 112, and the adding circuit 310 is a digital circuit. In other embodiments, the outputs of the waveform generators may be analog signals, and the differencing circuits may be analog circuits (e.g., resistive or reactive power combiners). In such an embodiment, the array of digital to analog converters 115 may be absent from a transmitter otherwise analogous to the embodiment of FIG. 1 (digital to analog converters may instead be present in the waveform generators), and the array of analog to digital converters 315 may be absent from a receiver otherwise analogous to the embodiment of FIG. 3.

Figure 4:
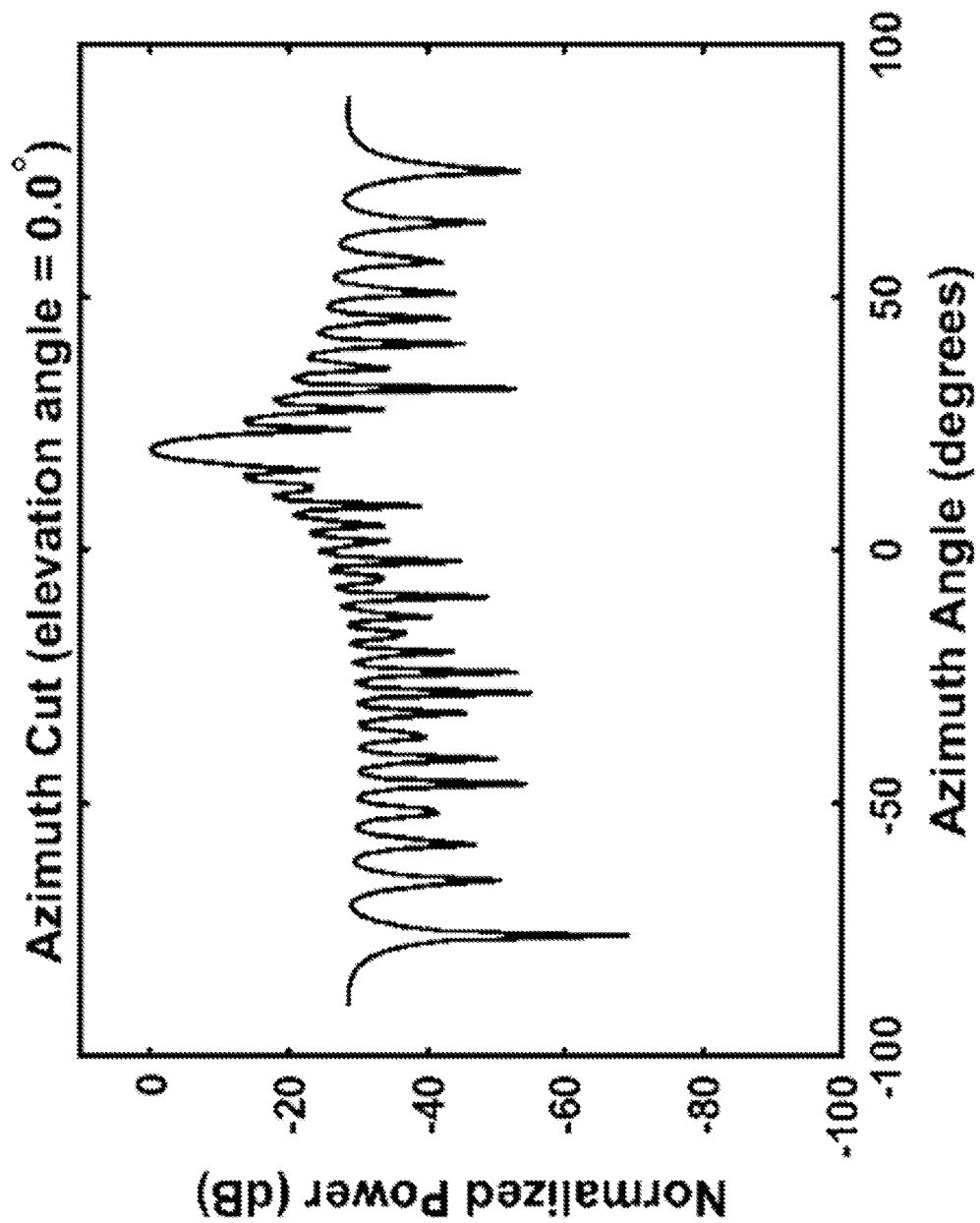
FIG. 4 is a graph of an antenna pattern, according to an embodiment of the present invention.

FIG. 4 shows a simulated antenna pattern, according to an embodiment of the present invention. Shifting of the main lobe by about 20 degrees from normal can be seen from this graph, as well as side lobes all of which are at least 13 dB below the main lobe. The phase shift operation is performed digitally at baseband in this simulation for an X-band signal (10 GHz) with lambda/2 spacing between elements of 0.015 meters.

Table 1 below shows the reduction in resources (e.g., multipliers and lookup tables (LUTs)) possible in a design in a field-programmable gate array. The second row of Table 1 shows resources used by a first design in which complex multiplication is used to effect a phase shift, and the third row shows the resources used by a second design in which subtraction (e.g., as in the embodiment of FIG. 1) is used to effect a phase shift. As may be seen from Table 1, a dramatic reduction in resource use is possible using subtraction to effect a phase shift.

| | Multipliers Needed: 32 elements | Multipliers Needed: 1024 Elements | Implemented with LUTs: 32 Elements | Implemented with LUTs: 1024 Elements |
|---|---|---|---|---|
| Complex Multiply Method for Digital Phase Shift | 128 | 4096 | 130,816 | 4,186,112 |
| DDS based Method | 0 | 0 | 889 | 16,761 |

Each of the digital circuit described herein may be (or may be a portion of) a processing circuit. The term "processing circuit" (or "processing means") is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Although limited embodiments of a system for direct digital synthesis based phase shift digital beam forming have been specifically described and illustrated herein, many modifications and variations will be apparent to those skilled in the art. Accordingly, it is to be understood that a system for direct digital synthesis based phase shift digital beam forming employed according to principles of this invention may be embodied other than as specifically described herein. The invention is also defined in the following claims, and equivalents thereof.

What is claimed is:
1. A transmitter, comprising:
a first antenna element;
a second antenna element;
a first waveform generator;
a second waveform generator;
a third waveform generator;
a first differencing circuit,
  having:
    a first input connected to the first waveform generator,
    a second input connected to the second waveform generator, and
    an output operatively coupled to the first antenna element, and
  being configured to generate at the output a difference between a signal at the first input and a signal at the second input; and
a second differencing circuit,
  having:
    a first input connected to the first waveform generator,
    a second input connected to the third waveform generator, and
    an output operatively coupled to the second antenna element, and
  being configured to generate at the output a difference between a signal at the first input and a signal at the second input,
wherein the first waveform generator is configured to generate a modulated waveform.
2. The transmitter of claim 1, wherein the second waveform generator is configured to generate a piecewise sinusoidal signal and the third waveform generator is configured to generate a piecewise sinusoidal signal.
3. The transmitter of claim 2, wherein each of:
the first waveform generator;
the second waveform generator;
the third waveform generator;
the first differencing circuit; and
the second differencing circuit,
is a portion of a digital circuit.
4. The transmitter of claim 3, further comprising:
a first digital to analog converter having:
  an input connected to the output of the first differencing circuit, and
  an output;
a first mixer having an intermediate frequency port, a local oscillator input, and a radio frequency port, the intermediate frequency port being connected to the output of the first digital to analog converter;
a first filter having:
  an input connected to the radio frequency port of the first mixer, and
  an output;
a first amplifier having an input connected to the output of the first filter and an output connected to the first antenna element;
a second digital to analog converter having:
  an input connected to the output of the second differencing circuit, and
  an output;
a second mixer having an intermediate frequency port, a local oscillator input, and a radio frequency port, the intermediate frequency port being connected to the output of the second digital to analog converter;
a second filter having:
  an input connected to the radio frequency port of the second mixer, and
  an output; and
a second amplifier having an input connected to the output of the second filter and an output connected to the second antenna element.
5. The transmitter of claim 3, wherein the digital circuit is a hard-wired digital circuit.
6. The transmitter of claim 3, wherein the digital circuit is a programmable digital circuit.
7. The transmitter of claim 1, wherein the first waveform generator comprises a direct digital synthesizer.
8. The transmitter of claim 1, wherein each of:
the second waveform generator; and
the third waveform generator
comprises a direct digital synthesizer.
9. A receiver, comprising:
a first antenna element;
a second antenna element;
a first waveform generator;
a second waveform generator;
a first differencing circuit,
  having:
    a first input operatively coupled to the first antenna element,
    a second input connected to the first waveform generator, and
    an output, and
  being configured to generate at the output a difference between a signal at the first input and a signal at the second input;
a second differencing circuit,
  having:
    a first input operatively coupled to the second antenna element,
    a second input connected to the second waveform generator, and
    an output, and
  being configured to generate at the output a difference between a signal at the first input and a signal at the second input; and
an adding circuit, having a first input connected to the output of the first differencing circuit and a second input connected to the output of the second differencing circuit,
wherein each of:
  the first waveform generator; and
  the second waveform generator
comprises a direct digital synthesizer.
10. The receiver of claim 9, wherein the first waveform generator is configured to generate a piecewise sinusoidal signal and the second waveform generator is configured to generate a piecewise sinusoidal signal.
11. The receiver of claim 10, wherein each of:
the first waveform generator;
the second waveform generator;
the first differencing circuit;
the second differencing circuit; and
the adding circuit,
is a portion of a digital circuit.
12. The receiver of claim 11, further comprising:
a first analog to digital converter having:

an output connected to the first input of the first differencing circuit, and an input;

a first mixer having an intermediate frequency port, a local oscillator input, and a radio frequency port, the intermediate frequency port being connected to the input of the first analog to digital converter;

a first filter having:

an output connected to the radio frequency port of the first mixer, and an input;

a first amplifier having an output connected to the input of the first filter and an input connected to the first antenna element;

a second analog to digital converter having:

an output connected to the first input of the second differencing circuit, and an input;

a second mixer having an intermediate frequency port, a local oscillator input, and a radio frequency port, the intermediate frequency port being connected to the input of the second analog to digital converter;

a second filter having:

an output connected to the radio frequency port of the second mixer, and an input; and a second amplifier having an output connected to the input of the second filter and an input connected to the second antenna element.

13. The receiver of claim 12, wherein each of:

the first filter, and the second filter is a band-pass filter.

14. The receiver of claim 11, wherein the digital circuit is a hard-wired digital circuit.

15. The receiver of claim 11, wherein the digital circuit is a programmable digital circuit.

* * * * *